United States Patent
Kondo et al.

[11] Patent Number: 5,309,887
[45] Date of Patent: May 10, 1994

[54] METHOD OF DETECTING ABNORMALITY IN EXHAUST GAS RECIRCULATION CONTROL SYSTEM OF INTERNAL COMBUSTION ENGINE AND APPARATUS FOR CARRYING OUT THE SAME

[75] Inventors: Katsuhiko Kondo; Kouichi Nishimoto, both of Himeji, Japan

[73] Assignee: Mitsubishi Denki Kabushiki Kaisha, Tokyo, Japan

[21] Appl. No.: 101,735

[22] Filed: Aug. 4, 1993

[30] Foreign Application Priority Data

Aug. 7, 1992 [JP] Japan .................. 4-211636
Sep. 30, 1992 [JP] Japan .................. 4-261892

[51] Int. Cl.⁵ .......................... F02M 25/07
[52] U.S. Cl. ................................. 123/571
[58] Field of Search .................. 123/568, 571

[56] References Cited

U.S. PATENT DOCUMENTS

| | | | |
|---|---|---|---|
| 4,715,348 | 12/1987 | Kobayashi et al. | 123/571 |
| 4,770,146 | 9/1988 | Shibata et al. | 123/571 X |
| 4,825,841 | 5/1989 | Norota et al. | 123/571 X |
| 5,137,004 | 8/1992 | Takahata et al. | 123/571 |
| 5,150,695 | 9/1992 | Kondo | 123/571 |
| 5,152,273 | 10/1992 | Ohuchi | 123/571 |
| 5,154,156 | 10/1992 | Ohuchi | 123/571 |
| 5,184,594 | 2/1993 | Saitoh et al. | 123/571 |
| 5,251,599 | 10/1993 | Ohuchi et al. | 123/571 X |
| 5,257,610 | 11/1993 | Ohuchi | 123/571 |

*Primary Examiner*—Willis R. Wolfe
*Attorney, Agent, or Firm*—Sughrue, Mion, Zinn, Macpeak & Seas

[57] ABSTRACT

In an internal combustion engine equipped with an exhaust gas recirculation control system including an exhaust gas recirculation passage connected to an exhaust pipe and an intake pipe of the engine and an exhaust gas recirculation control valve disposed in the exhaust gas recirculation passage for selectively closing and opening the exhaust gas recirculation passage, a method and an apparatus for diagnosing the exhaust gas recirculation system as to occurrence of an abnormality on the basis of a change in pressure or air flow rate within the intake pipe which is brought about by actuation of the exhaust gas recirculation control valve. By actuating the exhaust gas recirculation control valve in a diagnosis enabling operation state of the engine, it is determined whether the change in the pressure or air flow rate reaches a preset value within a predetermined time. Occurrence of an abnormality in the exhaust gas recirculation system is decided unless the change reaches the preset value within the predetermined time.

19 Claims, 6 Drawing Sheets

METHOD OF DETECTING ABNORMALITY IN EXHAUST GAS RECIRCULATION CONTROL SYSTEM OF INTERNAL COMBUSTION ENGINE AND APPARATUS FOR CARRYING OUT THE SAME

BACKGROUND OF THE INVENTION

1. Field of the Invention

The present invention relates generally to a diagnosis method for detecting occurrence of an abnormality in an exhaust gas recirculation control system of an internal combustion engine (hereinafter also referred to simply as an engine) for a motor vehicle. More particularly, the invention is concerned with a method of diagnosing an exhaust gas recirculation control system of the engine with high reliability and without exerting adverse influences on the operating or running (i.e., operation performance) of the engine and hence of the motor vehicle. The invention is also concerned with an apparatus for carrying out the method.

2. Description of the Related Art

In an internal combustion engine for a motor vehicle, an exhaust gas recirculation control system is generally adopted which includes an exhaust gas recirculation passage (hereinafter also referred to as the EGR passage in abbreviation) extending from an exhaust pipe of the engine to an intake pipe for recirculating a part of the exhaust gas discharged from the engine to the intake pipe so that a maximum combustion temperature of a fuel is suppressed to such extent that generation of $NO_x$ upon combustion of fuel and contained in the engine exhaust gas can be reduced. In that case, recirculation of the exhaust gas to the intake system is not constantly performed but the timing for effectuating the exhaust gas recirculation as well as the amount of recirculation is controlled in dependence on the running or operating state of the engine by correspondingly controlling the actuation of an exhaust gas recirculation control valve (hereinafter also referred to as EGR valve) installed in the EGR passage. By way of example, in a low load range of the engine where combustion of the fuel is rather at a low level and generation of $NO_x$ is correspondingly low, recirculation of the exhaust gas is interrupted. Further, it is generally practiced to control or limit the amount of recirculation of the exhaust gas so that the ratio of the amount of exhaust gas recirculated to the amount of intake air remains substantially at a predetermined value.

In such an exhaust gas recirculation control system, an erroneous operation or occurrence of a fault in the EGR valve, a modulator for controlling the EGR valve and other components of the EGR system will make it difficult or impossible to effectuate the exhaust gas recirculation control as desired. For coping with such an inconvenience, there has been proposed an approach for diagnosing the EGR valve as to occurrence of some fault by directly detecting the actuated position of the EGR valve. This approach is, however, disadvantageous in that the exhaust gas recirculation control system is complicated in structure and becomes expensive, because provisions of not only a specific detector for detecting the actuated position of the EGR valve but also of a processing unit for processing the information supplied from the position detector are required.

As a method of detecting an abnormality or fault in the exhaust gas recirculation control system which can evade the aforementioned inconveniences, there may be mentioned a method which is disclosed in Japanese Patent Laid-Open No. 63-11127 (JP-A-63-11127), according to which an EGR valve installed in an EGR passage extending from an exhaust pipe to an intake pipe is temporarily manipulated (i.e., opened or closed) during recirculation of the exhaust gas to the intake pipe in the stable state of the engine load, and a change in the suction or intake pressure brought about by the manipulation of the control valve is detected, whereon decision is made as to whether the change in the suction pressure lies within a predetermined range. On the basis of the result of this decision, it is then determined if a fault occurs in the exhaust gas recirculation system.

The principle underlying this diagnosis method is based on the fact that actuation of the EGR valve is accompanied by a corresponding change in the suction pressure. Starting from this fact, it is contemplated to detect a fault occurring in the EGR valve and associated devices by checking the change of the suction pressure which is detected when a negative pressure playing a role in the actuation of the EGR valve changes. However, according to this known fault diagnosis method, it is required that the engine load is in the stable state when the EGR valve is to be temporarily actuated (opened/closed), which incurs, however, degradation in the operation performance of the engine as well as in the gas emission performance thereof and hence degradation in drivability of the motor vehicle. More specifically, in the stable state of the engine load in which the motor vehicle runs in an intermediate or high speed range, the air-fuel ratio of the fuel mixture is generally maintained at a substantially constant value. However, when the EGR valve is operated in the stable state of the engine load, the fuel-air ratio of the mixture undergoes corresponding a variation, involving the inconveniences such as mentioned above, even when the exhaust gas recirculation flow is limited.

Besides, the known diagnosis method also suffers a problem that the diagnosis can not be effected at a desired high frequency because the stable engine load state is prerequisite for effectuation of the abnormality diagnosis. Consequently, the known diagnosis method has a room for improvements in respect to the capability of detecting an abnormality of the exhaust gas recirculation system at the earliest possible stage.

As will be appreciate from the above description, the known method and apparatus for detecting abnormality in the exhaust gas recirculation system suffers from problems such as degradation in the operation performance of the engine and difficulty in detecting an abnormality at an early stage, because it is prerequisite that the temporary actuation (opening or closing) of the EGR valve be performed in the stable or steady state of the engine load.

SUMMARY OF THE INVENTION

In the light of the state of the art described above, it is an object of the present invention to provide a method which is capable of detecting an abnormality or fault in an exhaust gas recirculation system at an early stage with a simplified arrangement requiring no additional provision of any special sensor or the like in association with the system and the EGR valve and without degrading the operation performance or state of the engine.

Another object of the present invention is to provide an apparatus for carrying out the method mentioned above.

It is a further object of the present invention to provide a method and an apparatus which are capable of diagnosing an exhaust gas recirculation system of an engine as to occurrence of an abnormality or fault even in the steady operating state of the engine without exerting any adverse influences on the engine operation and without the need for additionally providing any special means to thereby mitigate the problems which the known diagnosis system suffers.

In view of the above and other objects which will become apparent as description proceeds, the present invention is directed to an exhaust gas recirculation control system of an internal combustion engine, which system includes an exhaust gas recirculation passage connected between an exhaust pipe and an intake pipe of the engine and an exhaust gas recirculation control valve disposed in the exhaust gas recirculation passage for selectively closing and opening the exhaust gas recirculation passage.

In conjunction with the exhaust gas recirculation system mentioned above, there is provided, according to a first aspect of the invention, a method of detecting occurrence of an abnormality or fault in the exhaust gas recirculation system on the basis of a change in the pressure within the intake pipe which is brought about by actuation of the exhaust gas recirculation control valve, which method comprises the steps of: temporarily opening or closing the exhaust gas recirculation control valve when the engine is decelerated, to thereby decide whether the change in the pressure within the intake pipe reaches a preset value within a predetermined time; and determining occurrence of an abnormality in the exhaust gas recirculation system unless the change in the pressure within the intake pipe reaches the preset value within the predetermined time.

In a preferred mode for carrying out the abnormality detecting method described above, the exhaust gas recirculation or EGR control valve may be opened to thereby allow the EGR passage to be opened in the engine decelerating state in which the fuel supply to the engine is cut, and decision is made to the effect that the EGR passage is not opened normally and thus an abnormality or fault is taking place in the exhaust gas recirculation system, when an increase in the intake air pressure does not reach a preset value even after the lapse of a predetermined time.

According to another aspect of the present invention, there is provided an apparatus for carrying out the diagnosis method described above. More specifically, in an internal combustion engine equipped with an exhaust gas recirculation control system which includes an exhaust gas recirculation passage connected between an exhaust pipe and an intake pipe of the engine and an exhaust gas recirculation control valve disposed in the exhaust gas recirculation passage for selectively closing or opening the exhaust gas recirculation passage, there is provided an apparatus for detecting an abnormality in the exhaust gas recirculation system on the basis of a change in the pressure within the intake pipe which is brought about by actuation of the exhaust gas recirculation control valve, which apparatus comprises: means for temporarily opening or closing the exhaust gas recirculation control valve when the engine speed is decelerated to thereby decide whether the change in the pressure within the intake pipe reaches a preset value within a predetermined time; and means for determining occurrence of an abnormality in the exhaust gas recirculation system unless the change in the pressure within the intake pipe reaches the preset value within the predetermined time.

With the apparatus of the structure described above, the abnormality diagnosis of the exhaust gas recirculation system can be performed substantially with the aid of the existing components employed for the engine operation control without the need for providing any additional parts.

According to a further aspect of the invention, there is provided for the internal combustion engine of the structure mentioned above, a method of detecting an abnormality in the exhaust gas recirculation system, which method comprises the steps of: detecting a change in a quantity representative of an operating state of the engine, said change being brought about by actuating the exhaust gas recirculation control valve from an operating state thereof to an inoperative state or vice versa; measuring a time taken for the change in the quantity to reach a preset value; and making decision as to occurrence of an abnormality in the exhaust gas recirculation system on the basis of the time as measured.

According to yet another aspect of the invention, there is provided an apparatus for carrying out the method described above, which apparatus comprises detection means for detecting a change in a quantity representative of operation state of the engine, said change being brought about by actuating the exhaust gas recirculation control valve from an operating state thereof to an inoperative state or vice versa; time measuring means for measuring a time taken for the change in the quantity to reach a preset value; and decision means for making decision as to occurrence of an abnormality in the exhaust gas recirculation system on the basis of the time as measured.

With the diagnosis method and apparatus described above, the abnormality diagnosis of the exhaust gas recirculation system can be carried out in the steady operation state of the engine without incurring any appreciable disturbance to the engine operation. Besides, the method and the apparatus can equally be realized by using an existing engine control system simply by appropriately programming operation of an engine control unit constituting a major part of the control system.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with preferred or exemplary embodiments thereof by reference to the drawings.

Embodiment 1

A first embodiment of the invention will be described.

Figure 1:
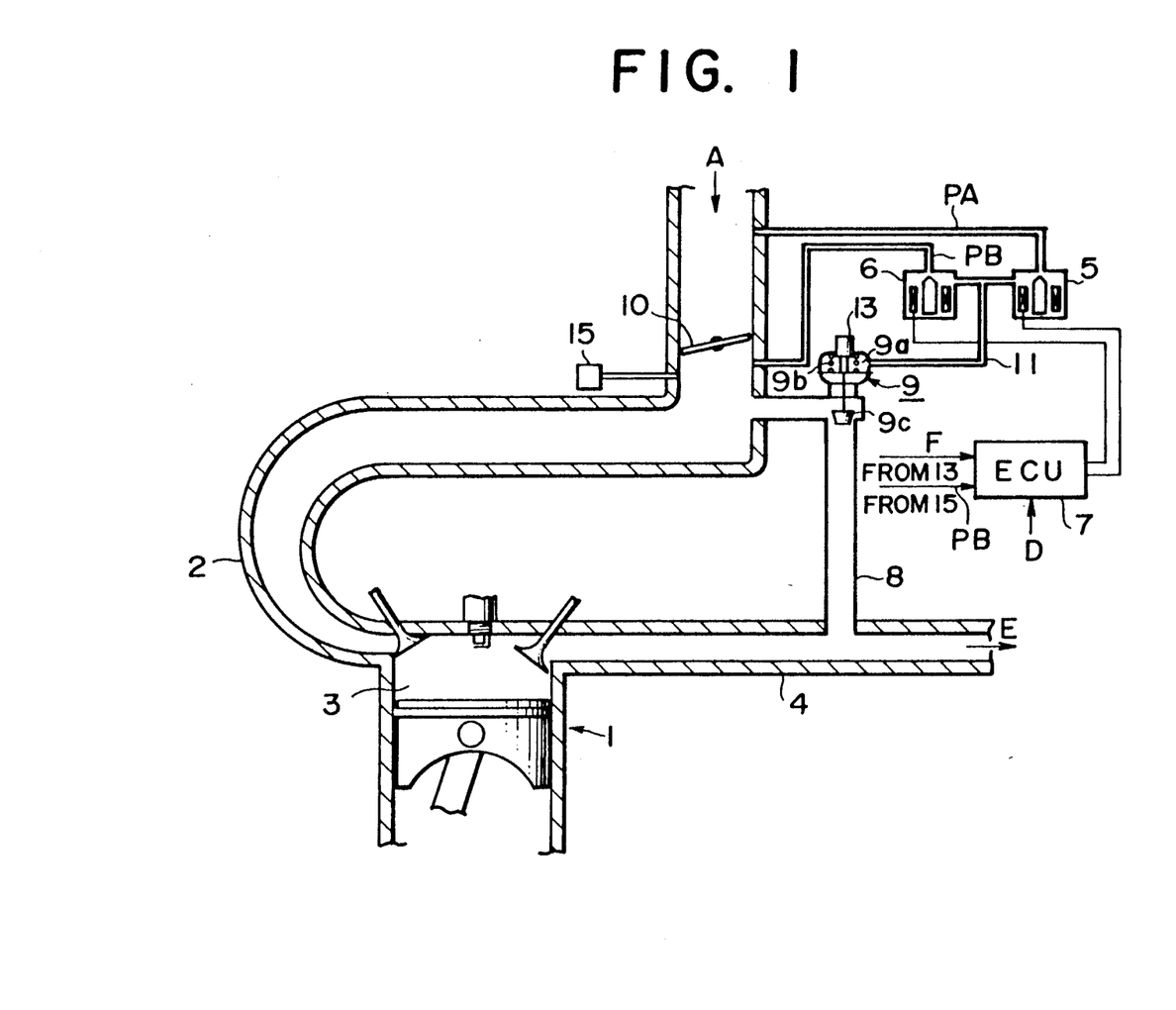
FIG. 1 shows schematically a general arrangement of an exhaust gas recirculation system of an internal combustion engine to which a first embodiment of the present invention can be applied.

FIG. 1 is a diagram showing schematically an internal combustion engine for a motor vehicle to which the instant embodiment of the invention can be applied.

An engine body generally denoted by a reference numeral 1 and including combustion chambers 3 (only one is shown) is equipped with an intake pipe 2 communicated to the combustion chamber 3 for taking in air from the atmosphere, as indicated by an arrow A, an exhaust pipe for discharging exhaust gas from the combustion chamber 3, as indicated by an arrow E. A throttle valve 10 is disposed within the intake pipe 2. A first electromagnetic valve 5 is provided in association with the intake pipe 2 and has an inlet port communicated to the latter at a position upstream of the throttle valve 10 so that the valve 5 can respond to the atmospheric pressure PA. Further, a second electromagnetic valve 6 is provided in association with the intake pipe 2 and has an inlet port opened in the passage 2 at a position downstream of the throttle valve 10 so that the valve 6 can respond to a suction pressure PB within the intake pipe 2. The electromagnetic valves 5 and 6 have respective electric terminals connected to an engine control unit (ECU) 7 to be thereby controlled in dependence on the operation states of the engine as determined on the basis of various input signals generally denoted by a reference character D.

More specifically, the engine control unit 7 is constituted by a microcomputer end in charge of various controls of the engine operation inclusive of the fuel injection control, ignition timing control and others. Needless to say, the engine control unit 7 is comprised of a central processing unit or CPU for executing calculations and processings, a memory for storing control programs and data for the operation of the CPU and input/output interfaces including A/D and D/A converters for fetching sensor signals and outputting control signals, as is known in the art.

The intake pipe 2 is communicated to the exhaust pipe 4 via an exhaust gas recirculation passage (hereinafter also referred to as the EGR passage) 8 equipped with an exhaust gas recirculation control valve (hereinafter also referred to as the EGR control valve) 9 which is actuated in dependence on pressure difference between the atmospheric pressure PA and the suction pressure PB.

In the normal operation in which the electro-magnetic valves 5 and 6 are opened, the EGR control valve 9 serves to introduce a part of the exhaust gas E to the intake pipe 2 from the exhaust pipe 4 in dependence on the engine running states represented by the above-mentioned pressure difference. The EGR control valve 9 thus constitutes a major part of the EGR system.

The EGR control valve 9 includes a pressure chamber 9a which is communicated to a common passage 11 which in turn leads to outlet ports of both the electromagnetic valves 5 and 6 so that the pressure difference between the atmospheric pressure PA and the suction pressure PB can be applied to the pressure chamber 9a of the EGR control valve 9. In this conjunction, it can easily be appreciated that when the first electromagnetic valve 5 is opened with the valve 6 being closed under the control of the control unit 7, the atmospheric pressure PA is introduced to the pressure chamber 9a of the EGR control valve 9 via the common passage 11, as a result of which a valve element 9c is urged downwardly, as viewed in the figure, under a spring force of a compression spring 9b. On the other hand, when the second electromagnetic valve 6 is opened with the valve 5 being closed to thereby introduce the suction pressure PB into the pressure chamber 9a, the valve element 9c is caused to move upwardly, as viewed in the figure, under a negative pressure against an urging force exerted by the compression spring 9b, whereby the EGR passage 8 is fully opened to thereby allow the exhaust pipe 4 to be communicated to the intake pipe 2. When both of the electromagnetic valves 5 and 6 are opened, the EGR control valve 9 is opened to an extent which is determined by the difference between the atmospheric pressure PA applied via the valve 5 and the suction pressure applied via the valve 6.

Provided in association with the EGR control valve 9 is a position sensor 13 which generates a valve position signal F indicative of the opening degree of the EGR control valve 9. The valve position signal F is inputted to the engine control unit 7. On the other hand, a pipe extends from the intake pipe 2 at a position downstream of the throttle valve 10 and is provided with a pressure sensor 15 mounted at a free end of the pipe. The pressure sensor 15 is adapted to detect the suction pressure PB, wherein the output signal of the pressure sensor 15 is also supplied to the engine control unit 7.

Figure 2:
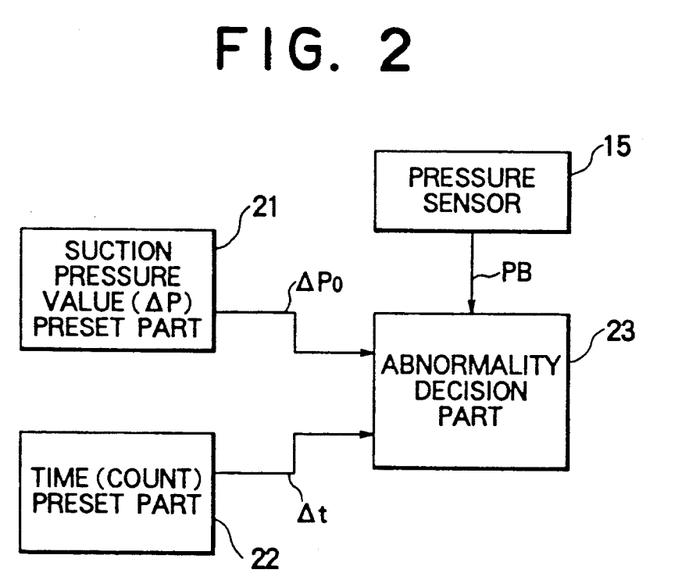
FIG. 2 is a block diagram for illustrating a fault or abnormality decision function realized by an engine control unit shown in FIG. 1.

FIG. 2 is a block diagram illustrating a fault or abnormality decision function realized internally of the engine control unit 7. To this end, the engine control unit 7 incorporates as functional parts a suction pressure value preset part 21 for setting a preset value $\Delta P_o$ for a deviation of the suction pressure PB, a time preset part 22 for setting a predetermined time (temporal period) $\Delta t$ and an abnormality decision part 23 for determining occurrence of abnormality in the EGR system on the basis of the suction pressure PB, the preset value $\Delta P_o$ and the predetermined time $\Delta t$. More specifically, the abnormality decision part 23 makes decision as to whether the deviation of the pressure (suction pressure) PB in the intake pipe 2 attains the preset value $\Delta P_o$ within the predetermined time $\Delta t$. When this decision results in negation, it is then determined that abnormality or fault is taking place in the EGR system.

Next, the diagnosis method according to the instant embodiment of the invention will be described by reference to a flow chart of FIG. 3 together with a suction pressure characteristic curve illustrated in FIG. 4 as well as FIGS. 1 and 2.

Figure 3:
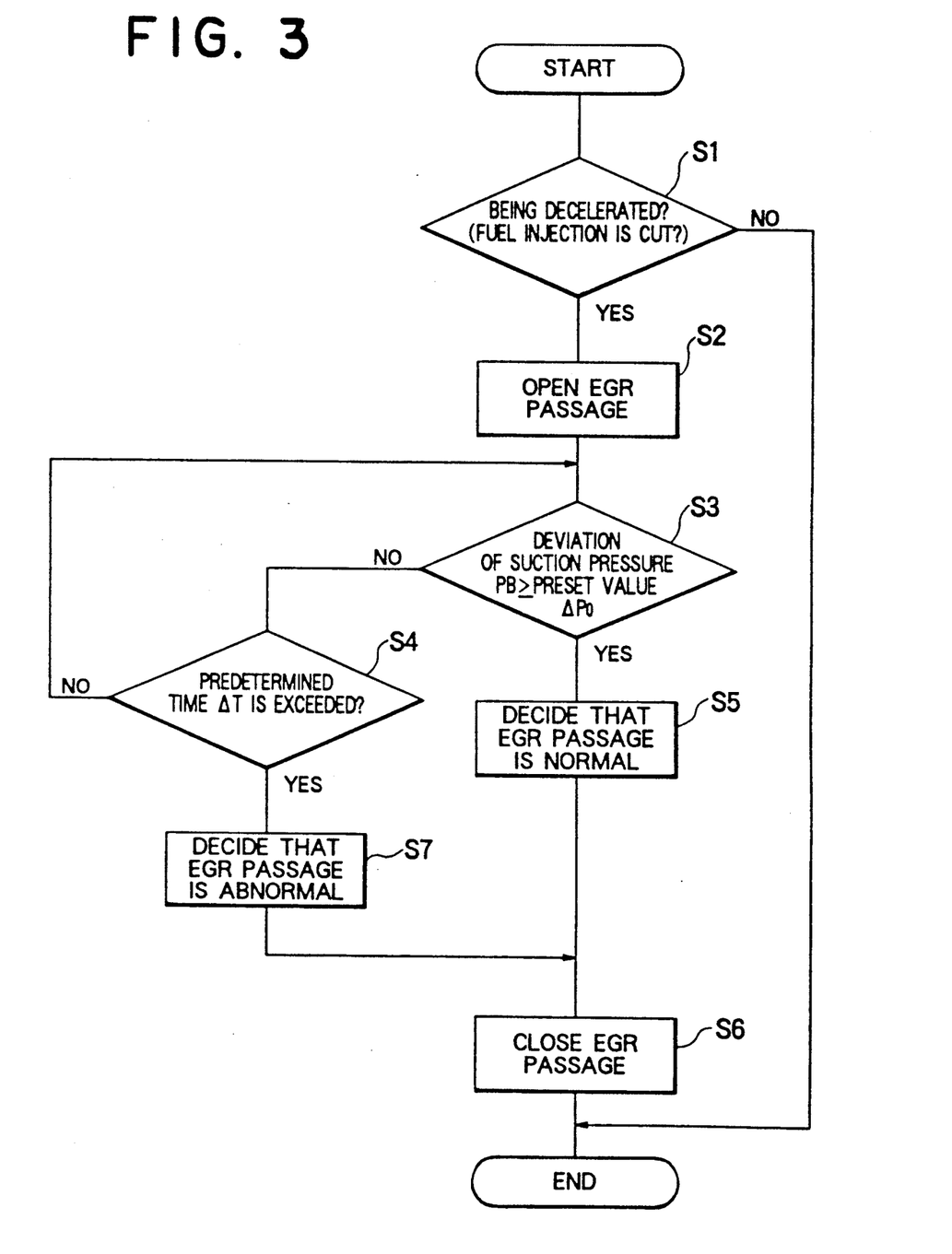
FIG. 3 is a flow chart for illustrating abnormality diagnosis of an exhaust gas recirculation system according to a first embodiment of the invention.
Figure 4:
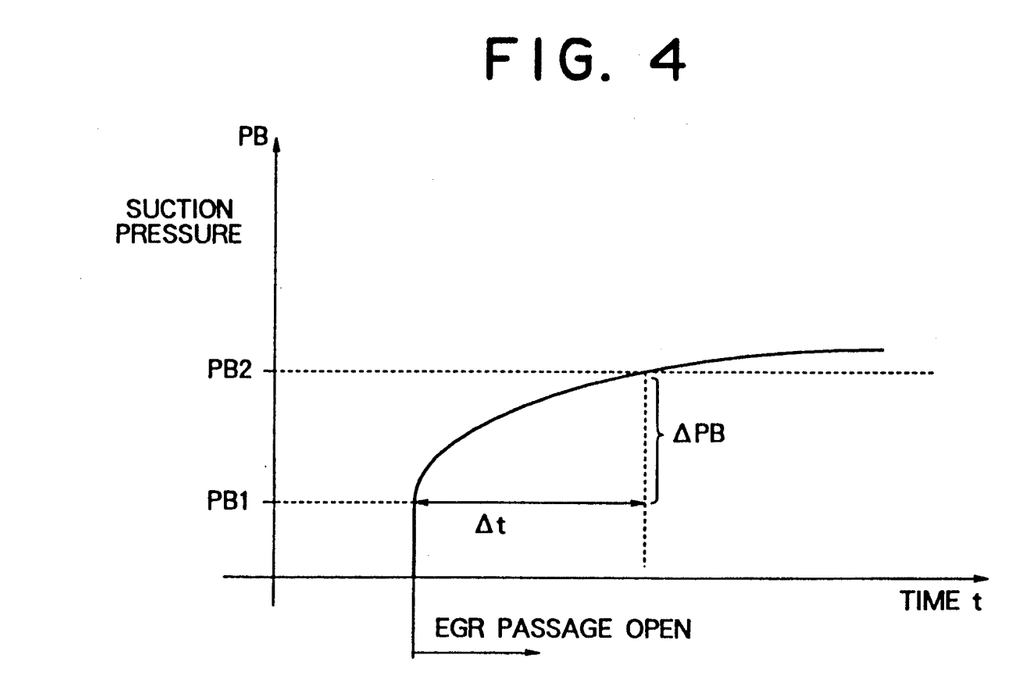
FIG. 4 is a characteristic diagram showing change in the intake air pressure of an engine for illustrating effectiveness of the diagnosis method according to the first embodiment of the invention.

An abnormality diagnosis routine shown in FIG. 3 is previously stored in the memory incorporated in the engine control unit 7 to be expected by the CPU thereof.

Referring to FIG. 3, in a step S1, decision is first made on the basis of the engine operation state indication signals D inclusive of a fuel injection signal, a throttle opening signal, an engine speed (rpm) signal and others outputted from respective sensors (not shown) as to whether the engine is being decelerated. Unless the engine is in the deceleration mode, the diagnosis routine shown in FIG. 3 is not executed by the engine control unit 7. In this conjunction, decision as to whether the engine speed is being decelerated may be effectuated by deciding whether the fuel injection is cut off.

When the engine is in the decelerating mode with the fuel injection being cut, the second electromagnetic valve 6 is opened with the first valve 5 being closed to thereby cause the EGR control valve 9 to be opened, which results in the opening of the EGR passage 8 (step S2). At that time, if the EGR passage 8 is in the normal state, a corresponding amount part of the exhaust gas E is recirculated to the intake pipe 2 via the EGR passage 8, as a result of which the suction pressure PB rises up, as is illustrated in FIG. 4.

In a succeeding step S3, the engine control unit 7 fetches the suction pressure (PB) signal outputted from the pressure sensor 15 to thereby decide whether or not the deviation or increment $\Delta PB$ in the suction pressure PB brought about by opening the EGR control valve 9 has reached at least the preset value $\Delta P_o$. When the deviation $\Delta PB$ is smaller than the preset value $\Delta P_o$, it is then decided whether a time not shorter than the predetermined time $\Delta t$ has elapsed from the time point when the EGR control valve 9 was opened (step S4). When the answer of this decision step S4 is negative (NO), the step S3 is regained, where it is decided again whether or not the deviation $\Delta PB$ becomes greater than or equal to the preset value $\Delta P_o$ (i.e., if $\Delta PB \geq \Delta P_o$) before lapse of the predetermined time $\Delta t$. When this decision step S3 results in affirmation (YES), then it is determined in a step S5 that the EGR passage 8 is normal. In this case, the second electromagnetic valve 6 is closed to thereby close the EGR passage 8 in a step S6, whereon the abnormality diagnosis comes to an end. On the other hand, unless the condition that $\Delta PB \geq \Delta P_o$ is satisfied before the lapse of the predetermined time $\Delta t$ (i.e., when decision step S4 results in affirmation (YES)), it is then determined in a step S7 that the EGR system suffers from abnormality (i.e., the exhaust pipe 4 is not normally communicated to the intake pipe 2 via the EGR passage 8). More specifically, when the EGR passage 8 is normal, the suction pressure PB will increase rapidly or steeply and thus the pressure deviation $\Delta PB$ will reach or exceed the present pressure value $\Delta P_o$ within the predetermined time $\Delta t$. In contrast, in case the EGR passage 8 is clogged (i.e., when the EGR passage is in the state incapable of satisfactorily recirculating the exhaust gas to the intake pipe 2), the suction pressure PB can increase only gently or progressively, as a result of which the pressure deviation $\Delta PB$ can not reach the preset value $\Delta P_o$ within the predetermined time $\Delta t$.

At this juncture, it should be mentioned that although a fault of the EGR control valve 9 can easily be detected by simple inspection, difficulty is encountered in diagnosis or detection of abnormality of the EGR passage. However, with the diagnosis method according to the instant embodiment of the invention, abnormality diagnosis of the EGR passage 8 can easily be performed. It should further be added that when recirculation of the exhaust gas is forcibly increased during normal operation of the engine, there will arise possibility that the optimal air fuel ratio control may be rendered impossible. However, the abnormality diagnosis effected in the decelerating operation mode of the engine where the fuel injection is cut, no problem is incurred because the recirculated exhaust gas provides no contribution to the combustion.

Embodiment 2

Next, a second embodiment of the invention will be described.

Figure 5:
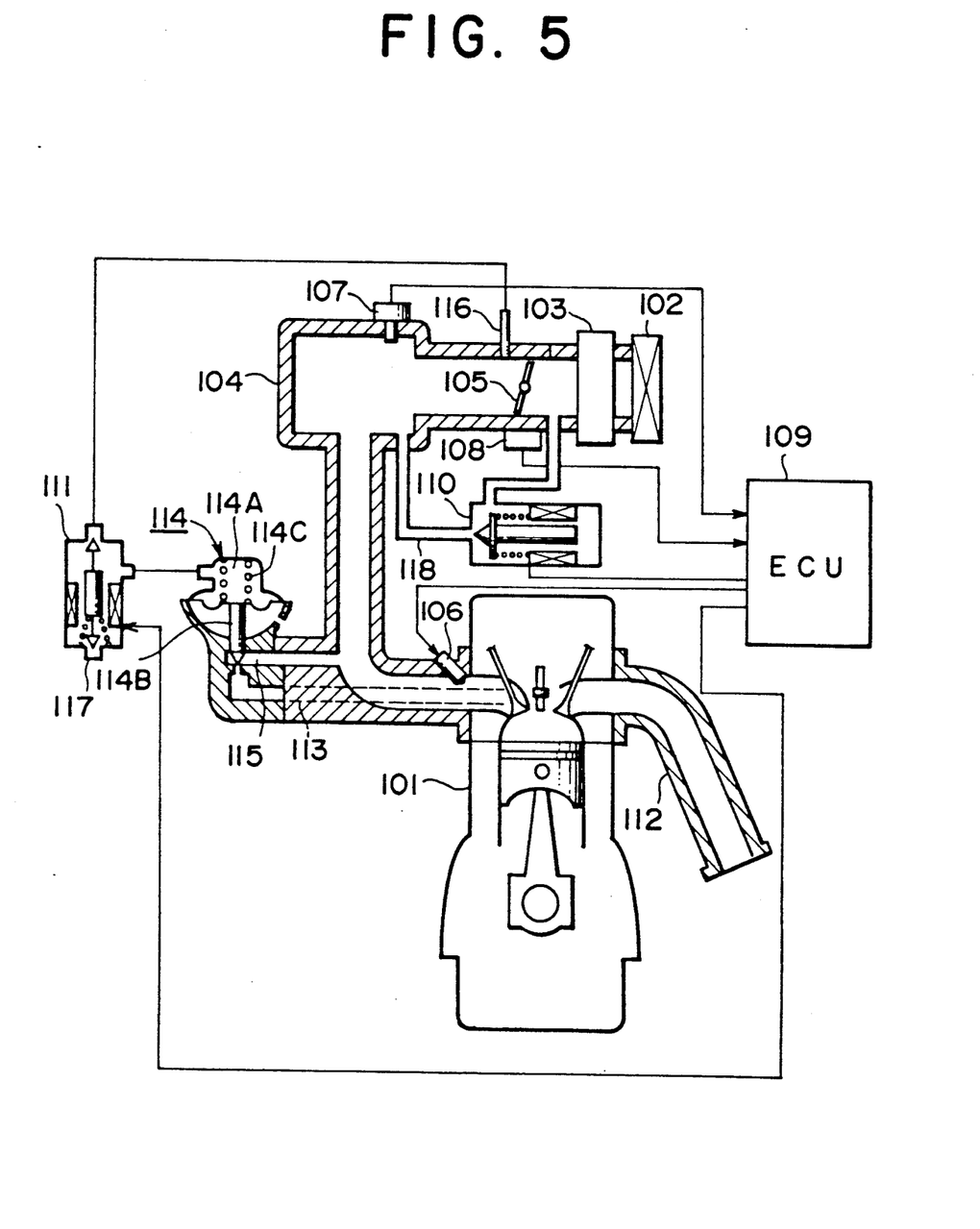
FIG. 5 is a view showing generally a structure of an exhaust gas recirculation control system for an internal combustion engine to which a second embodiment of the invention can be applied.

FIG. 5 is a diagram showing generally a structure of the exhaust gas recirculation control system for an internal combustion engine to which the second embodiment of the invention can be applied. Referring to the figure, a four-cycle internal combustion engine 101 for a motor vehicle is equipped with an intake pipe 104 and an exhaust pipe 112. In the intake pipe 104, there are installed an air cleaner 102, an air flow sensor 103 and a throttle valve 105 in this order as viewed in the direction in which the air in taken in, wherein a negative pressure tube 116 and a throttle sensor 108 are installed in the intake pipe 104 at respective positions located in the vicinity of the throttle valve 105. Further, a pressure sensor 107 is installed in the intake pipe 104 at a position downstream of the throttle valve 105. A conduit 118 is provided in parallel with the intake pipe 104 and communicated thereto at positions upstream of the throttle valve 105 and in the vicinity of the pressure sensor 107, respectively, wherein an air control valve 110 is installed in the conduit 118. Further, an electromagnetic fuel injection valve 106 is installed in the intake pipe 104 at a location close to the engine 101.

On the other hand, branched from the exhaust pipe 112 is an exhaust gas recirculation or EGR passage 113 (partially shown in broken line) which is communicated to the intake pipe 104 through an EGR control valve 114 and an EGR injection pipe 115. An electromagnetic valve 111 which is under control of an engine control unit 109 is provided in association with the EGR control valve 114 and has an inlet port connected to the control negative pressure pipe 116 mentioned above. The electronic engine control unit (ECU) 109 may be implemented in a structure similar to that of the first embodiment of the invention described hereinbefore and has input terminals supplied with the output signals of the pressure sensor 107, the throttle valve sensor 108 and others, while output terminals of the engine control unit 109 are connected to the air control valve 110 and the electromagnetic fuel injection valve 106.

In operation, the engine 101 takes in the air from the atmosphere via the air cleaner 102, the air flow sensor 103, the intake pipe 104 and the throttle valve 105, while the fuel is supplied to the engine 101 through the electromagnetic fuel injection valve 106 installed in the intake pipe 104 from a fuel supply system (not shown). The pressure sensor 107 disposed in the intake pipe 104 downstream of the throttle valve 105 serves to detect an absolute pressure within the intake pipe to thereby generate a voltage signal indicative of the absolute pressure. The air flow sensor 103 detects the flow rate of the intake air to generate a corresponding voltage signal. The throttle valve sensor 108 detects the opening degree of the throttle valve 105 to output a voltage signal indicative of the throttle opening. The engine control unit 109 fetches as inputs thereto the output signals of the air flow sensor 103, a crank angle sensor (not shown), the throttle valve sensor 108, a coolant water temperature sensor (not shown) and others for controlling the operations of the electromagnetic fuel injection valve 106, the air control valve 110 and the electromagnetic valve 111 in dependence on the input signals mentioned above. A part of the exhaust gas tapped from the exhaust pipe 112 into the EGR passage 113 is caused to flow into the intake pipe 104 at a location downstream of the throttle valve 105 via the EGR control valve 114 and the EGR injection pipe 115. The EGR control valve 114 is comprised of a negative pressure chamber 114A, a valve element 114B and a compression spring 114C, as is in the case of the EGR control valve 9 described hereinbefore in conjunction with the first embodiment of the invention, wherein the negative pressure chamber 114A of the EGR control valve 114 is connected via the electromagnetic valve 111 to the control negative pressure pipe 116 which in turn is connected to the intake pipe 104 at the position downstream of the throttle valve 105. Under the negative pressure within the negative pressure chamber 114A of the EGR control valve 114, the flow section area defined by the valve element 114B undergoes change, whereby the exhaust gas flow recirculated from the exhaust pipe 112 to the engine via the EGR control valve 114 and the EGR injection pipe 115 is controlled.

Next, description will be directed to the operation of the EGR control system. The electronic engine control unit 109 is so programmed as to realize optimal purification of the exhaust gas on the basis of the engine operation state quantities as inputted from the various sensors mentioned previously and at the same time control the operation of the EGR control valve 114 in such manner that no adverse influence is exerted to the engine operation. When the EGR control valve 114 is to be operated or opened, the engine control unit 109 outputs a signal for opening the electromagnetic valve 111. In that case, the negative pressure is applied to the negative pressure chamber 114A of the EGR control valve from the intake pipe 104 downstream of the throttle valve 105 via the control negative pressure pipe 116 and the electromagnetic valve 111, whereby the valve element 114B of the EGR control valve 114 is caused to open fully to allow the exhaust gas to be recirculated from the exhaust pipe 112. Thus, the EGR system is placed in the operating state. On the other hand, when the EGR system is to be made inoperative, the engine control unit 109 outputs a signal for closing the electromagnetic valve 111. In the closed state of this valve 111, the negative pressure chamber 114A of the EGR control valve 114 is communicated to the atmosphere via a pipe 117 of the electromagnetic valve 111. As a consequence, the valve element 114B assumes the fully closed position, whereby the exhaust gas recirculation is prevented. The EGR system thus becomes inoperative.

Now, the EGR system abnormality diagnosis according to the second invention will be described.

Figure 6:
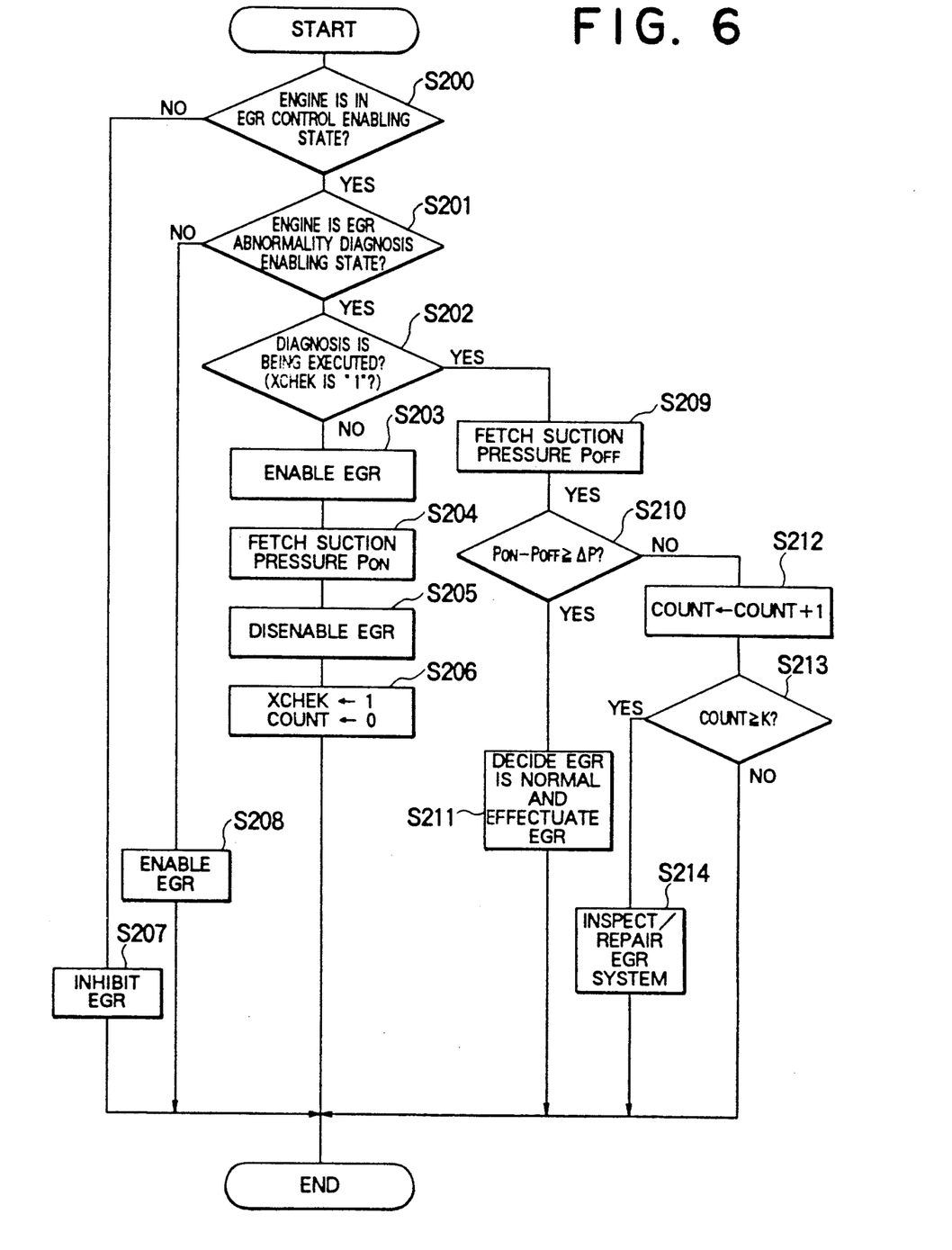
FIG. 6 is a flow chart for illustrating a diagnosis processing according to the second embodiment of the invention.

FIG. 6 is a flow chart for illustrating a diagnosis processing according to the instant embodiment. This diagnosis routine is stored as a program in the memory incorporated in the microcomputer-based engine control unit 109 and executed by the CPU periodically at a predetermined time interval.

Referring to FIG. 6, in a step S200, the engine speed (rpm) signal Ne, the intake air flow signal, the throttle opening signal, the water temperature signal and others are fetched from the crank angle sensor (not shown), the air flow sensor 103, the throttle sensor 108, the coolant water sensor (not shown) and other to thereby determine whether the engine is in the operation state which permits the exhaust gas recirculation. If the answer of this decision step S200 is negative, the processing proceeds to a step S207 where the electromagnetic valve 111 is closed to thereby inhibit the exhaust gas recirculation, whereupon the routine comes to an end. In case the engine operation state as determined permits the exhaust gas recirculation, the processing proceeds to a step S201 at which it is determined whether the engine operation state falls within an EGR abnormality diagnosis enabling zone. More specifically, in the step S201, change or deviation $\Delta Ne$ of the engine speed Ne per unit time and deviation $\Delta Th$ of the throttle opening Th per unit time are determined on the basis of the output signals of the respective sensors, and when these deviations $\Delta Ne$ and $\Delta Th$ are smaller than respective preset values, it is decided that the engine is in the steady state permitting the abnormality diagnosis of the EGR system. On the other hand, when at least one of the above-mentioned deviation (changes) $\Delta Ne$ and $\Delta Th$ exceeds the corresponding preset value, it is then decided in the step S201 that the engine is not in the steady state to permit the EGR system diagnosis. Accordingly, the processing proceeds to a step S208 at which the electromagnetic valve 111 is electrically energized to allow the exhaust gas recirculation to be effectuated, whereupon the routine comes to an end. As is apparent from the above description, the steady state of engine operation is selected as the reference for making decision as to execution of the EGR system diagnosis according to the instant embodiment. This is because erroneous diagnosis decision may be resulted when the engine is in transient state such as the starting, accelerating and/or decelerating state.

Next, in the step S202, decision is made as to whether or not the abnormality diagnosis is being executed by checking a flag XCHEK elucidated hereinafter. Unless this flag XCHEK is set, this means that the abnormality diagnosis is not being executed. Accordingly, it is decided that this is a first execution of the EGR system diagnosis since the engine has assumed the steady state permitting diagnosis, and the processing proceeds to a step S203 where the exhaust gas recirculation is effectuated, which is then followed by a step S204 in which the pressure $P_{ON}$ within the intake pipe 104 is fetched in the state where the exhaust gas recirculation is being effected. At this junction, it should be noted that in view of a possible lag in the response of the engine a time span longer than the lag should be interposed between the step S203 for starting the exhaust gas recirculation and the step S204 for fetching the pressure $P_{ON}$ within the intake pipe. Next, in a step S205, the EGR system is set to the inoperative state by opening the control valve 110. In a step S206, the flag XCHEK indicating that the EGR system diagnosis is being performed is set with a content or count of a time measuring counter incorporated in the engine control unit being cleared, whereupon the processing is completed.

When it is found in the step S202 that the flag XCHEK is set, i.e., when decided that the diagnosis is being effected, the processing then proceeds to a step S209 to fetch a pressure $P_{OFF}$ prevailing within the intake pipe at the current time point. Since the EGR system has been set to the inoperative state in the step S202, the intake air pressure $P_{OFF}$ in the inoperative state of the EGR system is fetched.

In a step S210, it is determined whether difference in the pressure within the intake pipe 104 (as detected by the sensor 107) between the operative state and the operative state of the EGR system (i.e., $P_{ON}-P_{OFF}$) attains or exceeds a preset value $\Delta P$. In this conjunction, it can easily be understood that when the EGR system is in the normal or sound state, the above mentioned pressure difference must attain or exceed the preset value $\Delta P$ in correspondence to the amount of the exhaust gas recirculated into the intake pipe. When the pressure difference ($P_{ON}-P_{OFF}$) is smaller than the present value $\Delta P$, the content "COUNT" of the time measuring counter is incremented in a step S212, which is followed by a step S213 where the content "COUNT" of the time measuring counter is compared with a predetermined value K which represents a maximum value of the time taken for the intake pipe pressure difference ($P_{ON}-P_{OFF}$) becomes equal to the preset value $\Delta P$ when the EGR system is changed to the inoperative state from the operating state on the presumption that the EGR systems suffers from no abnormality. Accordingly, when "COUNT"<K, this means that the time corresponding to the maximum value K does not lapse yet. Accordingly, it is decided that the diagnosis is being executed, whereon the processing comes to an end. On the other hand, when COUNT$\geq$K, this means that the pressure difference equal to $\Delta P$ is not taking place even after the time lapse exceeding the maximum value K. Accordingly, decision is made that a fault or abnormality is occurring in the EGR system, and an abnormality alarm or indicator lamp (not shown) is lit with abnormality information being stored in a RAM incorporated in the engine control unit for the self-diagnosis. The diagnosis processing is then terminated.

When it is determined in the step S210 that ($P_{ON}-P_{OFF}$)$\geq\Delta P$, this means that the pressure within the intake pipe undergoes a change equal to or greater than $\Delta P$ before the predetermined time K has lapsed. Accordingly, decision is made that the EGR system is normal, and a step S211 is executed to set the EGR system to the operative state by opening the control valve 110. Namely, the normal EGR control is resumed, and the processing is completed.

In case decision is made in the step S211 that the EGR system is normal, which is then followed by the decision of EGR abnormality in the step 214, repeated execution of the EGR abnormality diagnosis is inhibited in the step S201 for a predetermined period for ensuring the diagnosis of high reliability.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. By way of example, in the case of the first and second embodiments of the invention, the diagnosis of the EGR system is performed on the basis of change (difference) in the suction pressure within the intake pipe as brought about by changing over the EGR system from the operative state thereof to the inoperative state. However, the EGR system diagnosis can equally be effected by changing over the EGR system from the inoperative state to the operative state. Furthermore, the EGR system diagnosis can be carried out on the basis of a change in an intake air flow (output of the air flow sensor 103) about by the change-over of the EGR system as well a time taken for the change to attain a preset value. Besides, although the diagnosis according to the second embodiment is applied to the engine system including the air flow sensor 103 and the pressure sensor 107, the invention can equally be applied to the system in which only one of these sensors 103 and 107 is employed. Accordingly, all suitable modifications and equivalents may be resorted to, falling within the spirit and scope of the invention.

We claim:

1. In an internal combustion engine equipped with an exhaust gas recirculation control system which includes an exhaust gas recirculation passage connected between an exhaust pipe and an intake pipe of said engine, and an exhaust gas recirculation control valve disposed in said exhaust gas recirculation passage for controlling an exhaust gas flow through said recirculation passage, a method of detecting occurrence of an abnormality in said exhaust gas recirculation system on the basis of a change in a pressure within said intake pipe which is brought about by actuation of said exhaust gas recirculation control valve, said method comprising the steps of:

temporarily opening or closing said exhaust gas recirculation control valve when the engine is decelerated, to thereby decide whether a change as brought about in the pressure within said intake pipe reaches a preset value within a predetermined time; and determining occurrence of an abnormality in said exhaust gas recirculation system unless said change in the pressure within said intake pipe reaches said preset value within said predetermined time.

2. In an internal combustion engine equipped with an exhaust gas recirculation control system which includes an exhaust gas recirculation passage connected between an exhaust pipe and an intake pipe of said engine, and an exhaust gas recirculation control valve disposed in said exhaust gas recirculation passage for controlling an exhaust gas recirculation through said recirculation passage, an apparatus for detecting occurrence of an abnormality in said exhaust gas recirculation system on the basis of a change in a pressure within said intake pipe which is brought about by actuation of said exhaust gas recirculation control valve, said apparatus comprising:

suction pressure sensing means disposed in said intake pipe at a position downstream of a throttle valve for detecting a pressure within said intake pipe;

engine operating state detecting means for detecting whether said engine is being decelerated;

actuation means responsive to an output signal of said engine operating state detecting means indicative of a deceleration of said engine for temporarily actuating said exhaust gas recirculation control valve to thereby fetch an output signal of said suction pressure sensing means;

decision means for determining, on the basis of the output signal of said suction pressure sensing means, whether a difference between the suction pressures before and after the actuation of said exhaust gas recirculation control valve reaches a preset value within a predetermined time; and diagnosis means for determining that said exhaust gas recirculation system suffers an abnormality when decision of said decision means is affirmative.

3. A diagnosis apparatus according to claim 2, wherein said engine operating state detecting means includes a sensor for detecting whether a fuel supply to said engine is cut or not, to thereby output a signal indicating a deceleration of said engine when the fuel supply is being cut.

4. A diagnosis apparatus according to claim 2, wherein said actuation means includes electromagnetic valve means having two inlet ports connected to said intake pipe at positions upstream and downstream of said throttle valve, respectively, so as to receive the atmospheric pressure and said suction pressure, respectively, and an outlet port connected to a control inlet port of said exhaust gas recirculation control valve;
wherein said recirculation control valve is opened in response to said suction pressure while being closed in response to said atmospheric pressure.

5. In an internal combustion engine equipped with an exhaust gas recirculation control system which includes an exhaust gas recirculation passage connected between an exhaust pipe and an intake pipe of said engine, and an exhaust gas recirculation control valve disposed in said exhaust gas recirculation passage for controlling an exhaust gas flow through said recirculation passage,
a method of detecting occurrence of an abnormality in said exhaust gas recirculation system, said method comprising the steps of;
detecting a change in a quantity representative of an operating state of said engine, said change being brought about by actuating said exhaust gas recirculation control valve from one to another state;
measuring a time taken for said change of said quantity to reach a preset value; and
making decision as to occurrence of an abnormality in the exhaust gas recirculation system on the basis of the time as measured.

6. A method according to claim 5, wherein said one state represents an operating state of said exhaust gas recirculation system and said another state represents an inoperative state thereof.

7. A method according to claim 5, wherein said one state represents an inoperative state of said exhaust gas recirculation system and said another state represents an operative state thereof.

8. A method according to claim 5, wherein said quantity is given as a suction pressure within said intake pipe.

9. A method according to claim 5, wherein said quantity is given as an intake air flow within said intake pipe.

10. A method according to claim 5, further comprising the step of determining, on the basis of an operating state of said engine, whether or not execution of said abnormality detecting method is permissible,
wherein when said abnormality detecting method is permissible, said change detecting step, said measuring step and said decision step are executed.

11. A method according to claim 5, wherein said predetermined time is selected to be a maximum value of the time required for said change of said quantity when said exhaust gas recirculation system is normal.

12. In an internal combustion engine equipped with an exhaust gas recirculation control system which includes an exhaust gas recirculation passage connected between an exhaust pipe and an intake pipe of said engine, and an exhaust gas recirculation control valve disposed in said exhaust gas recirculation passage for controlling an exhaust gas recirculation through said recirculation passage,
an apparatus for diagnosing said exhaust gas recirculation system as to occurrence of an abnormality, said apparatus comprising:
detection means for detecting a change in a quantity representative of an operating state of the engine, said change being brought about by actuating said exhaust gas recirculation control valve from one to another state thereof;
time measuring means for measuring a time taken for said change of said quantity to reach a preset value; and
decision means for making decision as to occurrence of an abnormality in the exhaust gas recirculation system on the basis of the time as measured.

13. An apparatus according to claim 12, wherein said one state represents an operating state of said exhaust gas recirculation system and said another state represents an inoperative state thereof.

14. An apparatus according to claim 12, wherein said one state represents an inoperative state of said exhaust gas recirculation system and said another state represents an operative state thereof.

15. An apparatus according to claim 12, wherein said detection means includes a pressure sensor disposed in said intake pipe.

16. An apparatus according to claim 12, wherein said detection means includes an intake air flow sensor disposed in said intake pipe.

17. An apparatus according to claim 12, further comprising means for previously determining, on the basis of the operating state of said engine, whether or not execution of said abnormality diagnosis is permissible.

18. An apparatus according to claim 12, wherein said predetermined time is selected to be a maximum value of the time required for said change of said quantity when said exhaust gas recirculation system is normal.

19. An apparatus according to claim 12, further comprising:
actuation means for temporarily actuating said exhaust gas recirculation control valve to thereby effectuate said diagnosis,
said actuation means including an electromagnetic valve connected to said intake pipe at positions located upstream and downstream of a throttle valve, respectively, so that when said electromagnetic valve is opened, the atmospheric pressure is supplied to said intake pipe independent of the position of said throttle valve.

* * * * *